(12) United States Patent
Murphy et al.

(10) Patent No.: US 9,025,031 B2
(45) Date of Patent: May 5, 2015

(54) APPARATUS FOR HOUSING SURVEILLANCE DEVICES, AND A SURVEILLANCE UNIT COMPRISING THE APPARATUS

(76) Inventors: Joseph Nicholas Murphy, Dublin (IE); David Barry Murphy, Dublin (IE)

( * ) Notice: Subject to any disclaimer, the term of this patent is extended or adjusted under 35 U.S.C. 154(b) by 687 days.

(21) Appl. No.: 13/377,957

(22) PCT Filed: Jun. 17, 2010

(86) PCT No.: PCT/IE2010/000039
§ 371 (c)(1),
(2), (4) Date: Dec. 13, 2011

(87) PCT Pub. No.: WO2010/146572
PCT Pub. Date: Dec. 23, 2010

(65) Prior Publication Data
US 2012/0092504 A1 Apr. 19, 2012

(30) Foreign Application Priority Data

Jun. 17, 2009 (GB) .................................. 0910431.6

(51) Int. Cl.
| | | |
|---|---|---|
| H04N 7/18 | (2006.01) |
| G03B 17/55 | (2006.01) |
| G03B 17/02 | (2006.01) |
| G08B 13/196 | (2006.01) |
| H04N 5/225 | (2006.01) |
| G08B 15/00 | (2006.01) |

(52) U.S. Cl.
CPC .............. *G03B 17/55* (2013.01); *G03B 17/02* (2013.01); *G08B 13/19619* (2013.01); *G08B 15/001* (2013.01); *G08B 13/1963* (2013.01); *G08B 13/19643* (2013.01); *G08B 13/19697* (2013.01)

(58) Field of Classification Search
CPC ....... H04N 7/181; H04N 5/232; H04N 5/247; G08B 13/19645; G08B 13/19693
USPC .......................................................... 348/159
See application file for complete search history.

(56) References Cited

U.S. PATENT DOCUMENTS

| | | | |
|---|---|---|---|
| 4,320,949 A * | 3/1982 | Pagano .................... 396/427 |
| 6,619,922 B2 * | 9/2003 | Illingworth et al. .......... 416/185 |
| 6,881,025 B2 * | 4/2005 | Illingworth et al. .......... 415/58.2 |
| 7,193,037 B2 * | 3/2007 | Brott et al. .................... 530/324 |
| 2002/0140848 A1 * | 10/2002 | Cooper et al. ................ 348/373 |
| 2003/0210346 A1 * | 11/2003 | Hildreth ....................... 348/373 |
| 2003/0231881 A1 * | 12/2003 | Hering et al. ................. 396/427 |
| 2007/0268121 A1 * | 11/2007 | Vasefi et al. .................. 340/506 |
| 2009/0027493 A1 * | 1/2009 | Amar et al. .................... 348/77 |
| 2013/0066470 A1 * | 3/2013 | Wang et al. ................... 700/275 |
| 2014/0142757 A1 * | 5/2014 | Ziegler et al. ................ 700/255 |

FOREIGN PATENT DOCUMENTS

| | | |
|---|---|---|
| JP | 3-262277 A | 11/1991 |
| JP | 3262277 A | 11/1991 |
| JP | 9-149301 A | 6/1997 |
| JP | 9-172564 A | 6/1997 |
| JP | 9172564 A | 6/1997 |
| JP | 10-173960 A | 6/1998 |
| JP | 2000-50121 A | 2/2000 |
| JP | 2000-236461 A | 8/2000 |

OTHER PUBLICATIONS

International Search Report for PCT/IE2010/000039.
Communication dated Jun. 30, 2014, issued by the Japanese Patent Office in counterpart Japanese Application No. 2012-515622 with English translation.

\* cited by examiner

*Primary Examiner* — Sath V Perungavoor
*Assistant Examiner* — Howard D Brown, Jr.
(74) *Attorney, Agent, or Firm* — Sughrue Mion, PLLC

(57) ABSTRACT

A surveillance unit (1) comprises a support pole (3) and apparatus (5) mounted on the support pole (3) for housing surveillance cameras (6,7) and infrared heat detectors (8) in a controlled environment. The apparatus (5) comprises a primary housing (10) defining a primary hollow interior region (11) supported on a main support platform (21) which is mounted on the support pole (3). A secondary housing (14) defining a secondary hollow interior region (15) is coupled to the primary housing (10) by a tubular coupling element (17) which defines a communicating passageway (18) for communicating the primary and secondary hollow interior region (11,15). The secondary housing (14) comprises a lower secondary shell (68) of polycarbonate material and an upper secondary shell (73) which form the secondary hollow interior region (15). A PTZ camera (7) is located in a central first chamber (87) of the secondary hollow interior region (15) and eight first cameras (6) are located in the secondary hollow interior region (15) spaced apart at 45° intervals around the central first chamber (87). Medium and low voltage panels (59,60) are located in the primary hollow interior region (11) for controlling and monitoring data from the cameras (6,7) and the infrared heat detectors (8). An air conditioning unit (31) located in the primary housing (10) controls the temperature of air within the primary and secondary hollow interior regions (11,15) in order to maintain a controlled temperature environment within the primary and secondary hollow interior regions (11,15). An electrically powered circulating fan (130) located in an air accommodating duct (120) which extends from the primary hollow interior region (11) into the secondary hollow interior region (15) through the communicating passageway (18) circulates air from the air conditioning unit (31) between the primary and secondary hollow interior regions (11,15).

22 Claims, 10 Drawing Sheets

Fig. 31

APPARATUS FOR HOUSING SURVEILLANCE DEVICES, AND A SURVEILLANCE UNIT COMPRISING THE APPARATUS

BACKGROUND OF THE INVENTION

The present invention relates to apparatus for housing surveillance devices, and the invention also relates to a surveillance unit comprising the apparatus. In particular, the invention relates to such apparatus and a surveillance unit of the type suitable for monitoring the grounds of a building, the perimeter of an estate, a pipeline or the like, although the invention is not limited to such apparatus and surveillance units.

Surveillance apparatus for carrying out surveillance of the grounds of a building, the perimeter of an estate, a pipeline, for example, a pipeline, such as oil pipelines extending above ground over a desert for many hundreds of kilometers are known, and in general, comprise pole mounted digital cameras. One or more upstanding poles, in general are provided with respective platforms mounted on the top thereof, and one or more the digital cameras are mounted on a mounting bracket extending upwardly from the platform or depending downwardly therefrom. In general, servo-motors are provided for rotating the cameras about respective vertical axes, and for tilting the cameras about respective horizontal axes. Such camera arrangements require control circuitry, for both controlling the camera functions as well as for controlling the servo-motors. The control circuitry for controlling the camera functions typically is located within a housing of the camera while the control circuitry for controlling the servo-motors is located in a separate housing mounted on the platform. While such arrangements of surveillance apparatus are adequate in areas which are not subjected to extreme environmental conditions, they are unsuitable in areas which are subjected to extreme environmental conditions, and in particular extreme temperatures such as extreme low temperatures of the order of −17° C. and extreme high temperatures of the order of +46° C. Temperatures of the order of +46° C. are encountered in tropical regions, and in particular in desert regions where pipelines for oil and other liquids and gases are commonly laid over ground and extend for many hundreds of kilometers. Temperatures of the order of −17° C. are commonly experienced in arctic and Antarctic conditions, likewise where pipelines for oil and other liquids and gases are laid over ground. Digital cameras and control circuitry therefor, as well as control circuitry for controlling the orientation of the digital cameras, in general, comprise integrated circuitry which is formed on one or more dies. Such integrated circuits and dies, in general, are only capable of operating within a limited range of temperatures, and thus, are entirely unsuitable for operating in regions of excessively high or excessively low temperatures, such as those discussed above.

Additionally, in such surveillance apparatus of the type know heretofore data from the cameras and any other surveillance instruments are hard wired back to a central monitoring station. This can involve significant expense particularly, where the apparatus is required to monitor the perimeter of a relatively large estate, or monitor pipeline of many hundreds of kilometers in length, or to monitor the borders of a country or state.

There is therefore a need for apparatus for housing surveillance devices which addresses at least some of these problems, and there is also a need for a surveillance unit which likewise addresses at least some of the problems of devices known heretofore.

The present invention is directed towards providing such apparatus and a surveillance unit.

SUMMARY OF THE INVENTION

According to the invention there is provided apparatus for housing surveillance devices, the apparatus comprising a primary housing defining a primary hollow interior region for housing control circuitry, and being adapted to communicate with an air conditioning element for receiving conditioned air therefrom to produce a controlled environment in the primary hollow interior region, a secondary housing defining a secondary hollow interior region for housing the surveillance devices, the secondary housing being coupled to the primary housing with the secondary hollow interior region and the primary hollow interior region communicating with each other through a communicating passageway, an air accommodating duct extending between the primary hollow interior region and the secondary hollow interior region through the communicating passageway, a circulating means for circulating air between the primary hollow interior region and the secondary hollow interior region to produce a controlled environment in the secondary hollow interior region, the circulating means being located for circulating the air from the primary hollow interior region to the secondary hollow interior region through one of the air accommodating duct and the communicating passageway externally of the air accommodating duct and returning the air from the secondary hollow interior region to the primary hollow interior region through the other of the air accommodating duct and the communicating passageway externally of the air accommodating duct.

Preferably, a central partition element is located in the secondary hollow interior region of the secondary housing forming a central first chamber and an outer chamber extending around the central first chamber, the outer chamber communicating with the central first chamber for accommodating air therebetween.

Advantageously, at least two radial partition elements located in the secondary hollow interior region of the secondary housing extending from the central partition element divide the outer chamber into at least two outer second chambers. Ideally, the radial partition elements are equi-spaced circumferentially around the central partition element. Preferably, at least four radial partition elements are provided dividing the outer chamber into four outer second chambers.

In one aspect of the invention the central first chamber communicates with one of the air accommodating ducts and the communicating passageway externally of the air accommodating duct, and each outer second chamber communicates with the other one of the air accommodating duct and the communicating passageway externally of the air accommodating duct. Preferably, the central first chamber communicates with the air accommodating duct.

In another aspect of the invention each outer second chamber is adapted for housing at least one surveillance device provided by a first camera. Preferably, each outer second chamber is adapted to house two first cameras.

In one embodiment of the invention a mounting means is provided for mounting each one of the first cameras in the corresponding outer second chamber. Preferably, each mounting means comprises an adjustable mounting means. Advantageously, each mounting means facilitates adjustment of the angle at which the corresponding first camera is directed in a substantially vertical plane.

In another aspect of the invention an annular mounting disc is located in the secondary hollow interior region of the secondary housing extending around and outwardly from the central partition element into the outer chamber, and dividing the outer chamber into a lower outer chamber and an upper outer chamber, the outer second chambers being formed in the lower outer chamber by the radial partition elements, the mounting means for mounting the first cameras in the outer second chambers being mounted on the mounting disc. Preferably, the mounting disc defines a plurality of air accommodating openings for accommodating air between the outer second chambers and the upper outer chamber.

Advantageously, the first cameras are provided in the outer second chambers. Preferably, each first camera located in the outer second chambers comprises a vari-focal lens.

In another embodiment of the invention each first camera provided in the outer second chambers is a 1/3 day/night internet protocol camera.

In a further embodiment of the invention each outer second chamber is adapted for housing a surveillance device comprising an infrared heat detector. Preferably, the infrared heat detectors are provided in the outer second chambers.

In another embodiment of the invention the central first chamber is adapted to accommodate a surveillance device provided by a second camera. Preferably, the second camera is located in the central first chamber. Advantageously, the second camera located in the central first chamber comprises a pan tilt and zoom camera.

Preferably, the secondary housing is located beneath the primary housing.

In one aspect of the invention the secondary housing comprises and upper secondary housing element coupled to the primary housing, and a lower secondary housing element of transparent material sealably secured to the upper secondary housing element. Preferably, the lower secondary housing element is releasably secured to the upper secondary housing element.

Preferably, a cable accommodating duct extends between the secondary housing and the primary housing communicating the secondary hollow interior region with the primary hollow interior region for accommodating electrical cables between the secondary hollow interior region and the primary hollow interior region.

In another embodiment of the invention the primary housing comprises an upper primary housing element and a lower primary housing element sealably secured to the upper primary housing element. Preferably, the lower primary housing element is releasably secured to the upper primary housing element.

In another embodiment of the invention the cable accommodating duct extends between the upper secondary housing element and the lower primary housing element.

Preferably, the upper primary housing element is of double skinned construction.

In a further aspect of the invention a main support platform is provided for supporting the primary housing, with the secondary housing located beneath the primary housing, the main support platform being adapted for mounting to a support element. Preferably, the main support platform is adapted to accommodate the communicating passageway extending between the primary housing and the secondary housing through the main support platform. Advantageously, the main support platform is adapted for mounting on a support element provided by a support pole. Ideally, the main support platform is adapted for mounting on top of a support pole.

In one aspect of the invention the main support platform defines a mounting socket for receiving the support element. Preferably, the mounting socket extends downwardly from the support platform and defines a downwardly facing open mouth for accommodating the support element upwardly into the mounting socket.

Advantageously, the main support platform is mounted on a support pole.

In one embodiment of the invention a coupling means is provided for coupling the secondary housing with the primary housing, the coupling means defining the communicating passageway. Preferably, the main support platform is adapted for accommodating the coupling means therethrough. Advantageously, the main support platform is adapted for accommodating the cable duct therethrough.

In another aspect of the invention the primary housing defines a main chamber for accommodating the air conditioning unit, the main chamber being adapted for receiving the air conditioning unit with the primary hollow interior region communicating with the air conditioning unit for receiving the conditioned air therefrom and for returning air to be conditioned thereto with the primary and secondary hollow interior regions, the communicating passageway and the air conditioning unit forming a closed system.

In one embodiment of the invention the air conditioning unit is located in the main chamber.

In another aspect of the invention the circulating means comprises an electrically powered fan. Preferably, the circulating means is located in the air accommodating duct.

In one embodiment of the invention the air accommodating duct extends through the primary hollow interior region and terminates adjacent the main chamber. Preferably, the air accommodating duct extends substantially horizontally in the primary hollow interior region, and extends downwardly into the secondary hollow interior region. Advantageously, the downwardly extending portion of the air accommodating duct terminates in the central first chamber.

In a further embodiment of the invention a mounting bracket secured to the main support platform carries a mast to which an antenna is mounted.

In a still further embodiment of the invention an electrical circuit support platform is located in the primary hollow interior region of the primary housing for supporting data processing circuitry for processing data from the surveillance devices for relaying to a remote central monitoring station. Preferably, the electrical circuit support platform is adapted for accommodating a radio transmitter for transmitting data from the data processing circuitry to the central monitoring station. Preferably, the transmitter comprises a radio transmitter.

Advantageously, the electrical circuit support platform is adapted for mounting a radio transmitter receiver thereon for receiving control signals from the central monitoring station for controlling the operation of at least one of the surveillance devices.

In another embodiment of the invention the data processing circuitry is adapted for processing signals received from each infrared heat detector.

In another embodiment of the invention a backup power supply is provided in the primary hollow interior region of the primary housing for powering the surveillance devices. Preferably, the backup power supply is adapted for powering the data processing circuitry and the radio transmitter receiver.

The invention also provides a surveillance unit comprising an elongated upstanding support pole, and apparatus according to the invention mounted thereon.

Preferably, the apparatus is mounted on the support pole adjacent the top thereof.

The advantages of the invention are many. A particularly important advantage of the apparatus according to the invention is that the surveillance devices such as the cameras when located in the secondary hollow interior region of the secondary housing are maintained in a temperature controlled environment, and thus are entirely isolated from the environment exterior of the apparatus. A further important advantage of the apparatus according to the invention is that the image data captured by the cameras is relayed to a remote central monitoring station by radio transmission, thus avoiding the need for hard wiring the surveillance devices such as cameras to the central monitoring station, thus significantly reducing the installation costs of the apparatus.

By locating the data processing circuitry and other control circuitry in the primary hollow interior region and the cameras in the secondary hollow interior region a further advantage of the invention is achieved in that heat generated by the control circuitry is isolated from the cameras, and thus, has little or no affect on the cameras. A further advantage of the invention is achieved when the air circulating means and the air accommodating duct are arranged to pass the return air from the secondary hollow interior region to the primary hollow interior region prior to being returned to the air conditioning element in that heat generated by the control circuitry in the primary hollow interior region is removed from the air being circulated through the air conditioning element prior to being returned to the secondary hollow interior region.

The provision of the air accommodating duct extending into the primary hollow interior region and terminating adjacent the air conditioning element provides a particularly important advantage when the air is being circulated through the air accommodating duct from the primary hollow interior region to the secondary hollow interior region, since the air delivered to the secondary hollow interior region is drawn directly from the air conditioning element.

BRIEF DESCRIPTION OF THE DRAWINGS

The invention will be more clearly understood from the following description of a preferred embodiment thereof which is given by way of example only with reference to the accompanying drawings in which.

DETAILED DESCRIPTION OF THE INVENTION

Referring to the drawings there is illustrated a surveillance unit according to the invention indicated generally by the reference numeral 1 for monitoring the grounds of a building, the perimeter of an estate, a pipeline or the like. The surveillance unit 1 comprises a ground mounted upstanding support pole 3 on which apparatus also according to the invention and indicated generally by the reference numeral 5 is mounted for housing surveillance devices in a temperature controlled environment. In this embodiment of the invention the surveillance devices are first and second cameras 6 and 7, respectively, and infrared heat detectors 8. Eight first cameras 6 which are 1/3 day/night internet protocol (IP) cameras with van-focal lenses are provided, and one second camera 7 which is a Pan Tilt and Zoom (PTZ) camera is provided.

The apparatus 5 comprises a primary housing 10 which defines a primary hollow interior region 11, and a secondary housing 14 which defines a secondary hollow interior region 15. The secondary housing 14 is coupled to the primary housing 10 by a coupling means, namely, a tubular coupling element 17 extending upwardly from the secondary housing 14 into the primary hollow interior region 11 of the primary housing 10. The coupling element 17 defines a communicating passageway 18 through which the primary and secondary hollow interior regions 11 and 15 communicate for accommodating flow of air between the primary and secondary hollow interior regions 11 and 15, as will be described below. The primary hollow interior region 11, the secondary hollow interior region 15 and the communicating passageway 18 together form an air tight chamber 20.

A main support platform 21 mounts the apparatus 5 on the support pole 3 adjacent the top thereof. A socket element 22 mounted on the main support platform 21 and extending downwardly therefrom defines a downwardly extending bore 23 which terminates in a downwardly facing open mouth 24 for engaging a top portion 25 of the support pole 3 in the bore 23. Gusset plates 27 extending from the socket element 22 to the main support platform 21 strengthen the main support platform 21. An opening 28 in the main support platform 21 accommodates the coupling element 17 therethrough from the secondary housing 14 into the primary hollow interior region 11 of the primary housing 10.

The primary housing 10 defines a main chamber 30 for accommodating an air conditioning element, namely, an air conditioning unit 31 for controlling the temperature of the air within the primary and secondary hollow interior regions 11 and 15 as will be described below. The main chamber 30 is communicable with the primary hollow interior region 11 for accommodating air to and from the air conditioning unit 31 between the primary hollow interior region 11 and the main chamber 30, so that the main chamber 30 and the air conditioning unit 31 together with the chamber 20 formed by the primary and secondary hollow interior regions 11 and 15 and communicating passageway 18 formed by the coupling elements 17 form a completely enclosed airtight system within which air conditioned by the air conditioning unit 31 is circulated and returned to the air conditioning unit 31.

In this embodiment of the invention the air conditioning unit 31 is an air conditioning unit sold by Fujitsu General (U.K.) Co. Limited of Herts., Great Britain under Model No. AKY9U. The air conditioning unit 31 comprises heating, cooling and dehumidifying functions, and is operable to control the temperature of the air in the primary and secondary hollow interior regions 11 and 15 at a temperature in the range of 18° C. to 25° C. even when the external temperature drops as low as −17° C. and rises to a temperature as high as +46° C. The air conditioning unit 31 comprises a heat exchanger (not shown) and an internal in-built high pressure cross fan (also not shown) for circulating air through the heat exchanger and for delivering conditioned air from the heat exchanger to the primary hollow interior region 11 and for drawing return air from the hollow interior region 11 into the heat exchanger. The air conditioning unit 31 is microprocessor controlled by its own internal microprocessor, and temperature sensors (not shown) adjacent an air inlet to the heat exchanger, and an air outlet from the heat exchanger monitor the return air temperature from the primary hollow interior region 11 and the flow air temperature to the primary hollow interior region 11 for maintaining the temperature in the primary and secondary hollow interior regions 11 and 15 within the temperature range of 18° C. to 25° C. Such air conditioning units as the air conditioning unit 31 will be well known to those skilled in the art, and further description should not be necessary.

Figures 1, 2, 3:
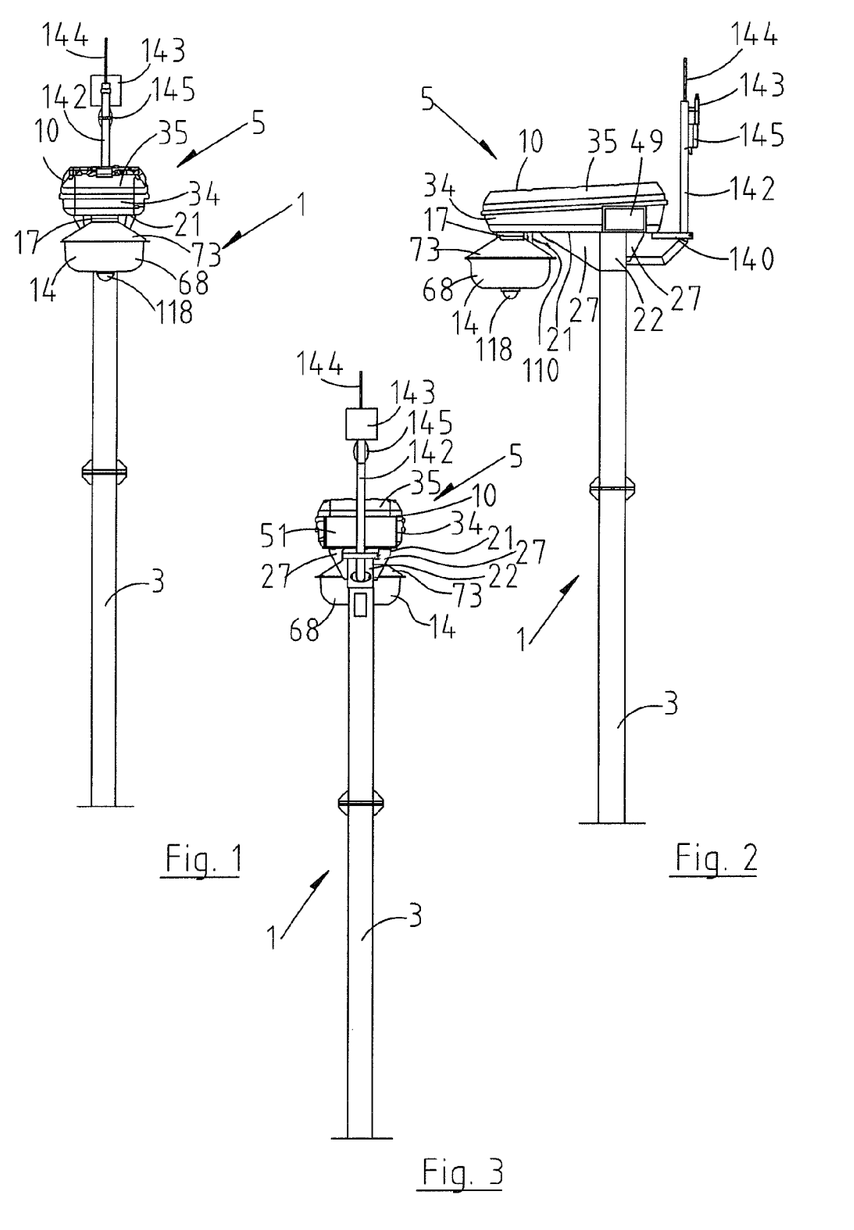
FIG. 1 is a front elevational view of a surveillance unit according to the invention.
FIG. 2 is a side elevational view of the surveillance unit of FIG. 1.
FIG. 3 is a rear end view of the surveillance unit of FIG. 1.
Figure 4:
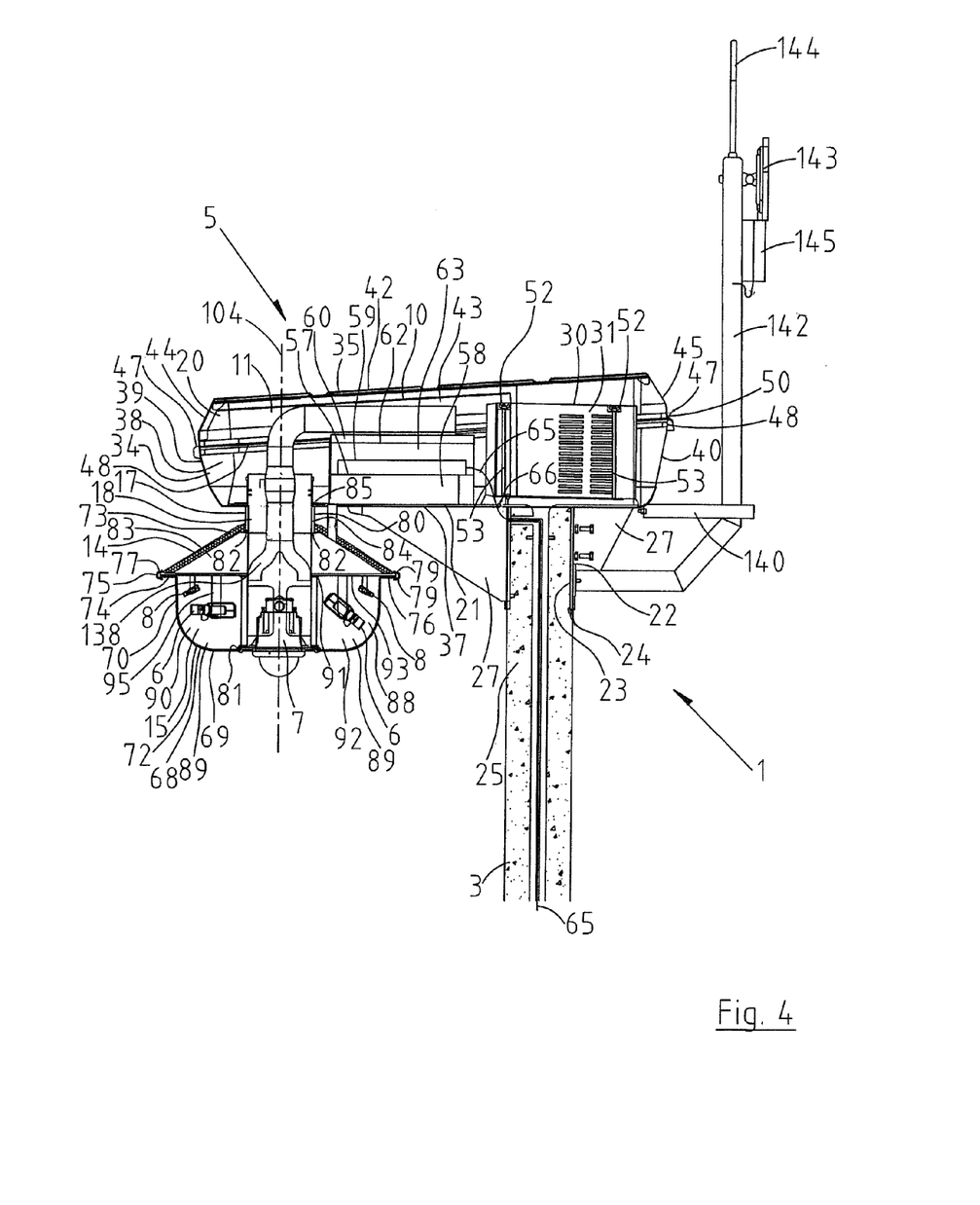
FIG. 4 is a cross-sectional side elevational view of apparatus also according to the invention of the surveillance unit of FIG. 1.
Figure 5:
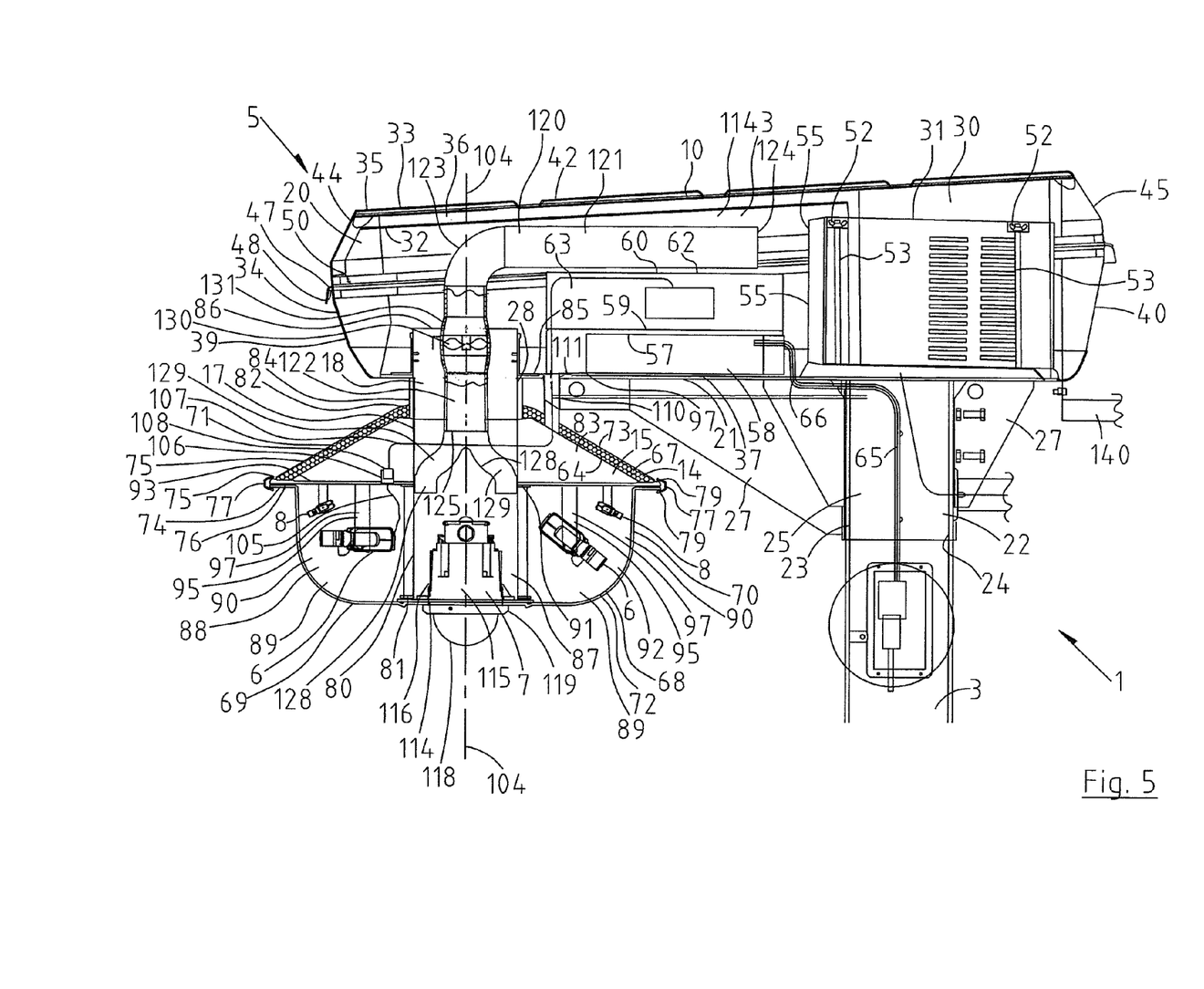
FIG. 5 is an enlarged cross-sectional side elevational view of the apparatus of FIG. 4.
Figure 6:
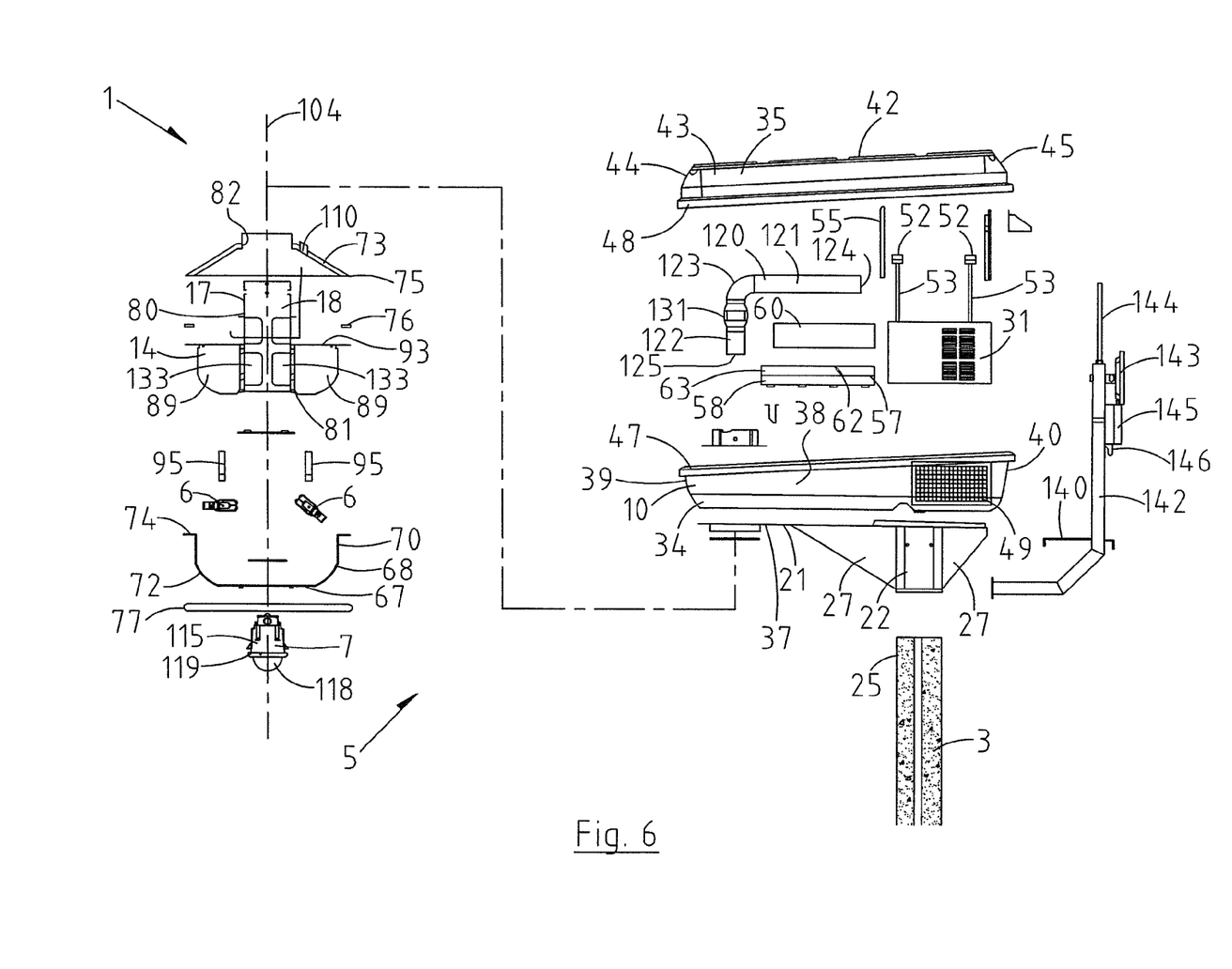
FIG. 6 is an exploded side elevational view of the apparatus of FIG. 4.
Figure 7:
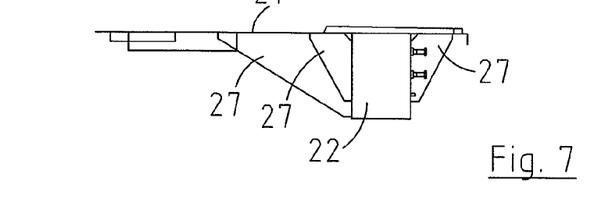
FIG. 7 is a side elevational view of a portion of the surveillance unit of FIG. 1.
Figure 8:
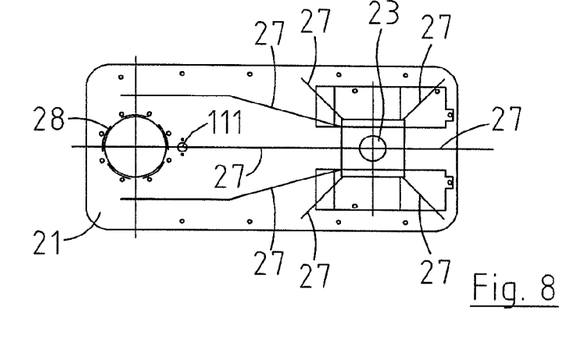
FIG. 8 is an underneath plan view of the portion of FIG. 7 of the surveillance unit of FIG. 1.
Figure 9:
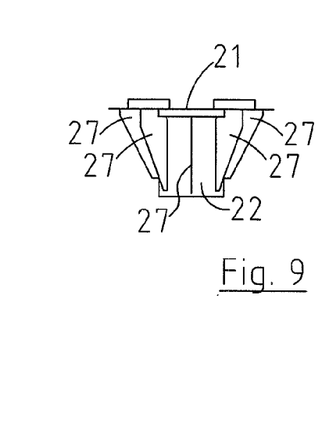
FIG. 9 is a front elevational view of the portion of FIG. 7 of the surveillance unit of FIG. 1.
Figure 10:
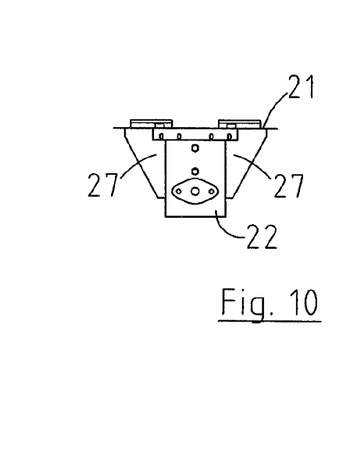
FIG. 10 is a rear end elevational view of the portion of FIG. 7 of the surveillance unit of FIG. 1.
Figure 11:
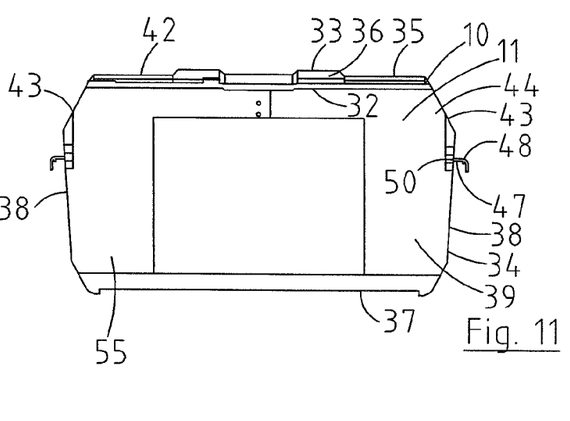
FIG. 11 is a cross-sectional end elevational view of a portion of the apparatus of FIG. 4.
Figure 12:
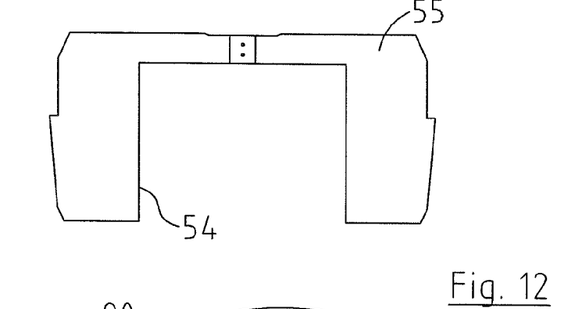
FIG. 12 is an end elevational view of another portion of the apparatus of FIG. 4.
Figure 13:
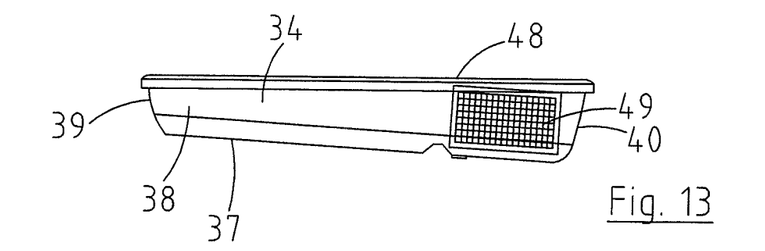
FIG. 13 is a side elevational view of a part of the portion of FIG. 11 of the apparatus of FIG. 1.
Figure 14:
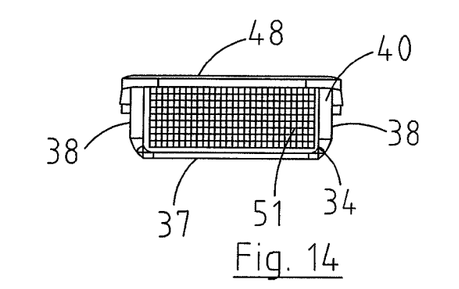
FIG. 14 is a rear end elevational view of the part of FIG. 13.
Figure 15:
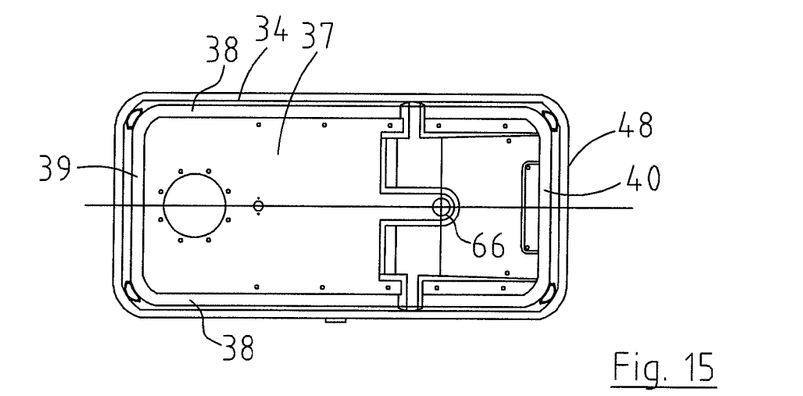
FIG. 15 is a top plan view of the part of FIG. 13.
Figure 16:
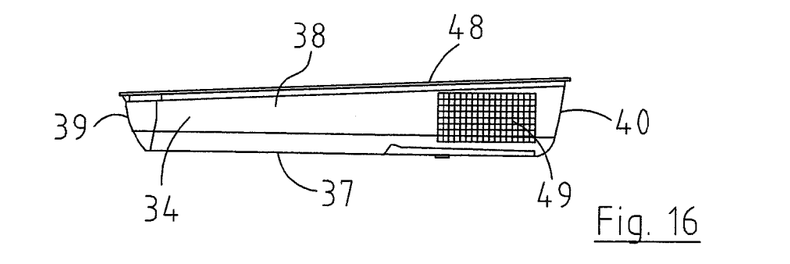
FIG. 16 is a cross-sectional side elevational view of the part of FIG. 13.
Figure 17:
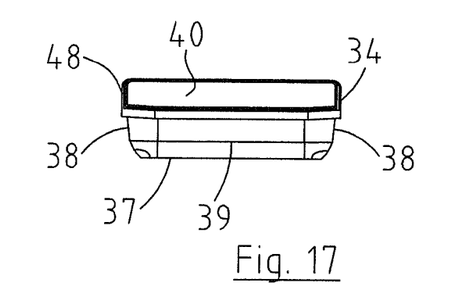
FIG. 17 is a front end elevational view of the part of FIG. 13.
Figure 18:
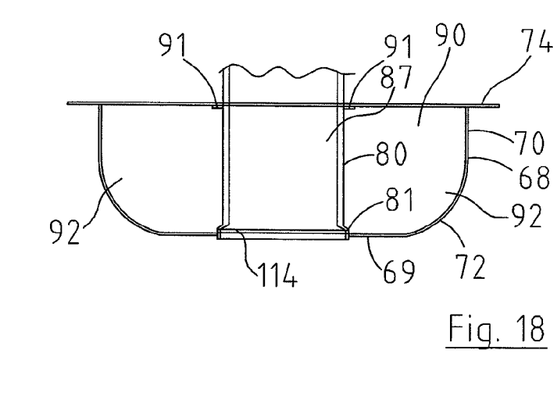
FIG. 18 is a cross-sectional side elevational view of another portion of the apparatus of FIG. 4.
Figure 19:
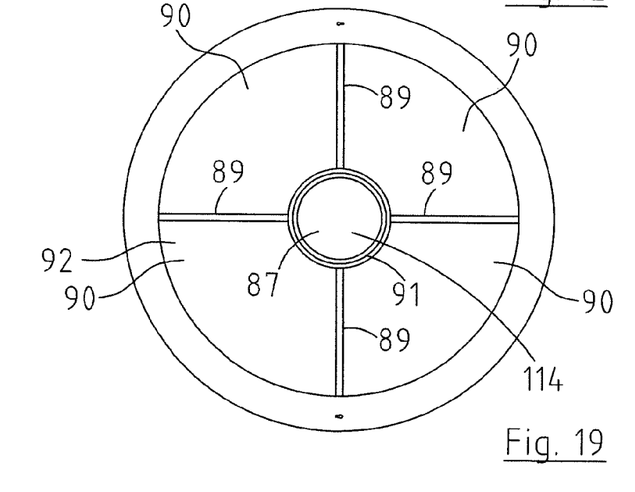
FIG. 19 is a top plan view of the portion of FIG. 18 of the apparatus of FIG. 4.
Figure 20:
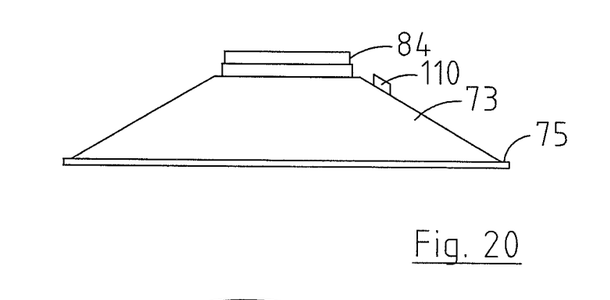
FIG. 20 is a side elevational view of another portion of the apparatus of FIG. 4.
Figure 21:
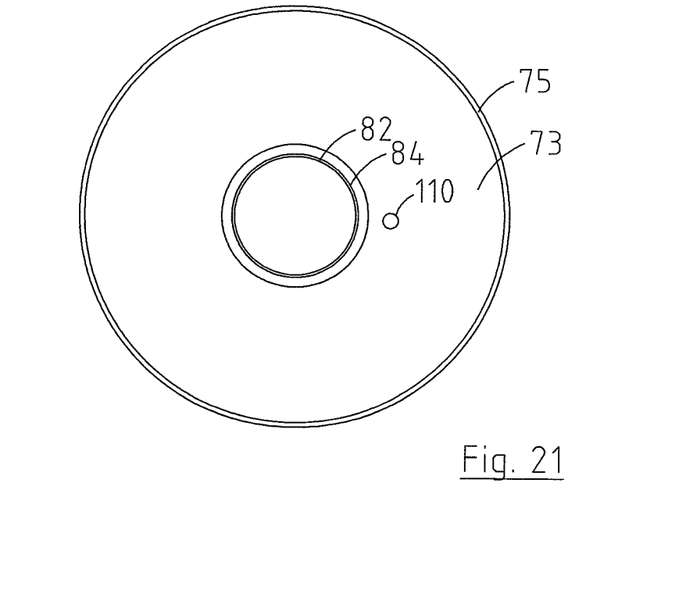
FIG. 21 is a top plan view of the portion of FIG. 20 of the apparatus of FIG. 4.
Figure 22:
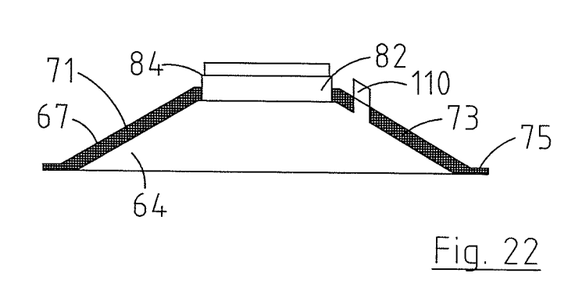
FIG. 22 is a transverse cross-sectional side elevational view of the portion of FIG. 20 of the apparatus of FIG. 4.
Figure 23:
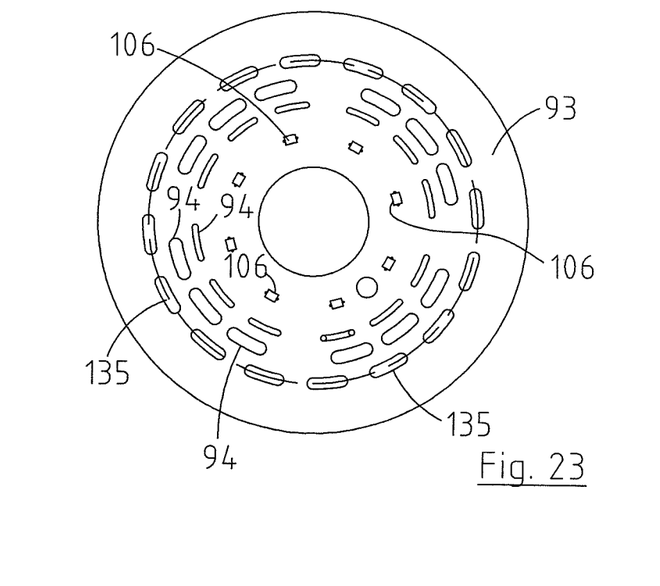
FIG. 23 is a top plan view of another part of the apparatus of FIG. 4.
Figure 24:
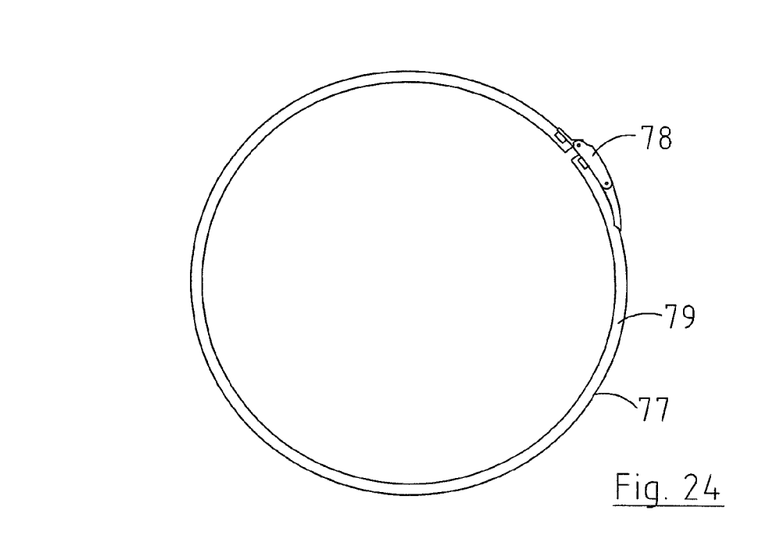
FIG. 24 is a top plan view of another part of the apparatus of FIG. 4.
Figure 25:
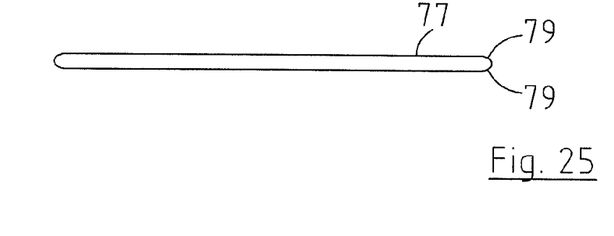
FIG. 25 is a cross-sectional side elevational view of the portion of FIG. 24 of the apparatus of FIG. 4.
Figure 26:
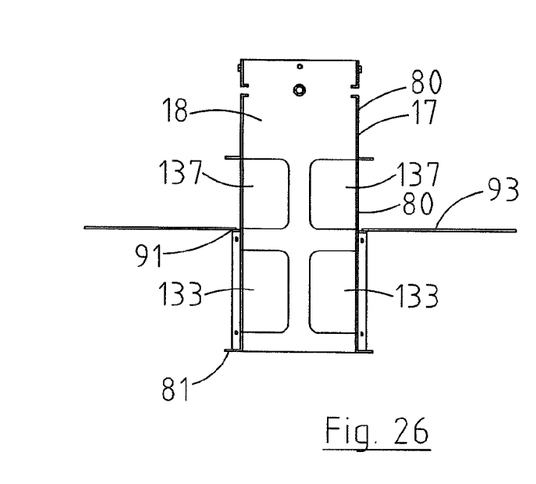
FIG. 26 is a cross-sectional side elevational view of another part of the apparatus of FIG. 4.
Figure 27:
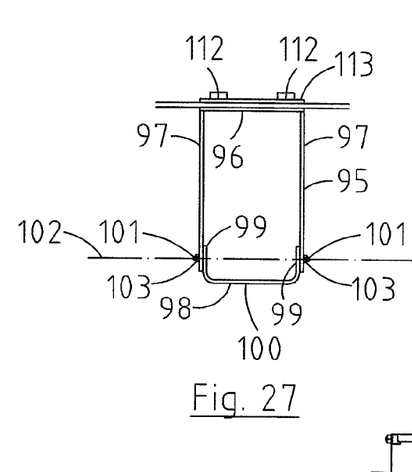
FIG. 27 is a side elevational view of a detail of the apparatus of FIG. 4.
Figure 28:
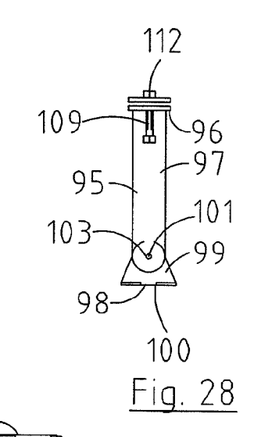
FIG. 28 is an end elevational view of the detail of FIG. 27 of the apparatus of FIG. 4.
Figure 29:
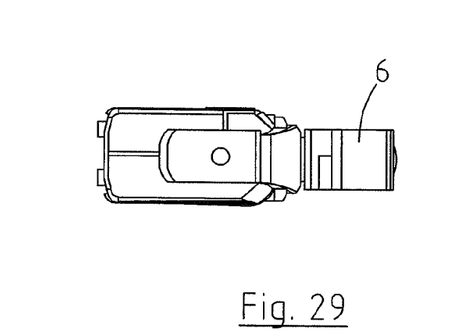
FIG. 29 is a top plan view of another part of the apparatus of FIG. 4.
Figure 30:
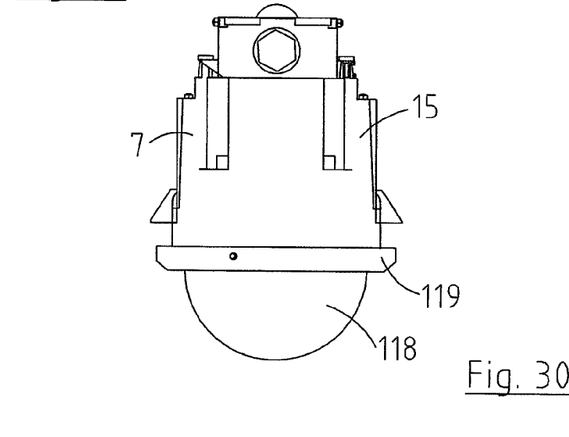
FIG. 30 is a side elevational view of another part of the apparatus of FIG. 4, and FIG. 31 are top plan views of electrical panels of the apparatus of FIG. 4.
Figure 31:
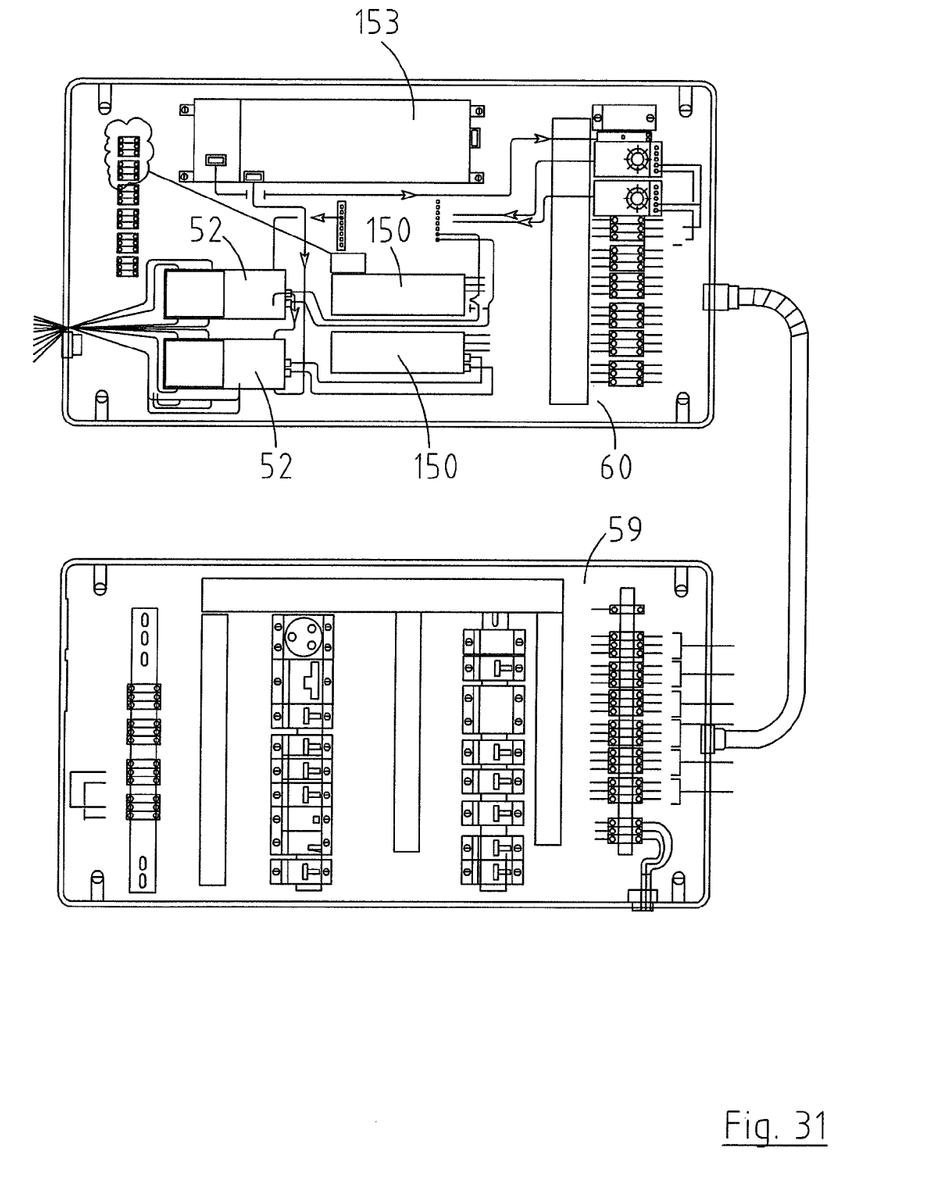

Turning now to the primary housing 10, the primary housing 10 is of plastics material and comprises a lower primary housing element, namely, a lower primary shell 34 of single skin construction and an upper primary housing element, namely, an upper primary shell 35 of double skin construction having an inner skin 32 and an outer skin 33 defining a void 36 therebetween which is filled with a heat insulating plastics material, namely, an expanded plastics material, see FIG. 5. The lower and upper primary shells 34 and 35 are sealably secured together to form the primary hollow interior region 11 and the main chamber 30. The lower primary shell 34 comprises a base wall 37, a pair of spaced apart upstanding side walls 38 extending upwardly from the base wall 37 and spaced apart front and rear end walls 39 and 40 extending upwardly from the base wall 37 joining the side walls 38. The upper primary shell 35 comprises a top wall 42 a pair of spaced apart downwardly extending side wall 43 extending downwardly from the top wall 42 and spaced apart front and rear end walls 44 and 45 extending downwardly from the top wall 42 between the side walls 43.

A lower flange 47 extends around the periphery of the side walls 43 and front and rear end walls 44 and 45 of the upper primary shell 35 adjacent the bottom thereof for engaging a corresponding upper flange 48 which extends around the side walls 38 and front and rear end walls 39 and 40 of the lower primary shell 34 for securing the lower and upper primary shell 34 and 35 together. A sealing gasket 50 is located between the lower flange 47 and the upper flange 48 for sealably securing the lower and upper primary shells 34 and 35 between the lower and upper flanges 47 and 48. Screws (not shown) secure the lower and upper flanges 47 and 48 with the stealing gasket 50 therebetween together.

Grills 49 in the side walls 38 of the lower primary shell 34 and a grill 51 in the rear end wall 40 of the lower primary shell 34 communicate with galleries (not shown) within the main chamber 30 for accommodating external air through the heat exchanger of the air conditioning unit 31 for accommodating air through heat exchange coils of a refrigeration unit of the heat exchanger for transferring heat therefrom. The galleries within the main chamber 30 are completely isolated from the remaining portion of the main chamber 30 and do not in any way communicate with the primary hollow interior region 11 in order to maintain the primary hollow interior region 11 and the secondary hollow interior region 15 together with the said remaining portion of the main chamber 30 a completely sealed enclosed unit which is isolated from the external environment.

The base wall 37 of the lower primary shell 34 is secured to the main support platform 21 by screws (not shown). The air conditioning unit 31 is secured to the base wall 37 of the lower primary shell 34 by wing nuts 52 on threaded rods 53 extending upwardly from the base wall 37 of the lower primary shell 34. An opening 54 in a transversely extending wall 55 within the primary housing 10, which separates the main chamber 30 within which the air conditioning unit 31 is located from the primary hollow interior region 11, accommodates flow air from the air conditioning unit 31 and return air to the air conditioning unit 31 for conditioning thereof.

A first platform 57 of metal material is spaced apart above the base wall 37 of the lower primary shell 34 within the primary hollow interior region 11 by a pair of spaced apart first side support members 58. A medium voltage panel 59 is supported on the first platform 57 and comprises circuitry for controlling the supply of electrical power to a low voltage panel 60, which is mounted on a second platform 62. The second platform 62 is spaced apart above the first platform 57 on second side support member 63 extending upwardly from the first side support members 58.

The low voltage panel 60 comprises data processing and control circuitry for controlling the operation of the first and second cameras 6 and 7 and for reading and processing image data therefrom, as well as reading and processing data from the infrared heat detectors 8, and for relaying image and other data to the remote central monitoring station as will be described below. A mains electricity cable 65 extending upwardly through the support pole 3 is accommodated through an opening (not shown) in the main support platform 21 and a sealed cable opening 66 in the base wall 37 of the lower primary shell 34 to the medium voltage panel 59. The main cable 65 is sealed in the cable opening 66 in order to maintain the primary hollow interior region 11 airtight.

Returning now to the secondary housing 14, the secondary housing 14 comprises a lower secondary housing element, namely, a lower secondary shell 68 of transparent polycarbonite material having a base wall 69 and a cylindrical side wall 70 extending upwardly from the base wall 69 and around the base wall 69. The cylindrical side wall 70 transitions via a radiused portion 72 to the base wall 69. An upper secondary housing element, namely, an upper secondary shell 73 of plastics material and of frusto-conical shape is secured to the lower secondary shell 68 to form the secondary hollow interior region 15. The upper secondary shell 73 is of double skin construction having an inner skin 64 and an outer skin 67 which define a void 71 therebetween which is filled with a heat insulating expanded plastics material. An upper flange 74 extending outwardly around the side wall 70 of the lower secondary shell 68 engages a lower peripheral edge 75 of the upper secondary shell 73, and is secured thereto with an annular sealing gasket 76 located between the lower peripheral edge 75 of the upper secondary shell 73 and the upper flange 74 of the lower secondary shell 68. The upper flange 74 of the lower secondary shell 68 and the lower peripheral edge 75 of the upper secondary shell 68 are secured together with the sealing gasket 76 therebetween by a band 77 of U-shape transverse cross-section with the lower peripheral edge 75 and the upper flange 74 engaged within the band 77. A toggle clip 78 secures and clamps the band 75 onto the upper secondary shell 73 adjacent the lower peripheral edge 75 and onto the upper flange 74 of the lower secondary shell 68. Side webs 79 of the U-shaped band 77 are angled to diverge outwardly relative to each other for clamping the lower edge 75 and the upper flange 74 together as the toggle clip 78 is tightened.

The tubular coupling element 17 comprises a cylindrical tube 80 which terminates at its lower end in an outwardly extending flange 81 which extends around the tube 80 and which is secured to the base wall 69 of the lower secondary shell 68, and extends upwardly through a top opening 82 in the upper secondary shell 73. An annular wall 84 extends around the top opening 82 in the upper secondary shell 73, and a sealing material is located between the annular wall 84 and the cylindrical tube 80 for sealably engaging the coupling element 17 in the top opening 82.

A flange 85 extending outwardly around the coupling element 17 towards a top end 86 thereof but spaced apart from the top end 86 of the coupling element 17 is secured to the base wall 37 of the lower primary shell 34 of the primary housing 10 and to the main support platform 21 for securing the secondary housing 14 to the primary housing 10 and to the main support platform 21.

The cylindrical tube 80 of the coupling element 17 being centrally located in the secondary hollow interior region 15 of the secondary housing 14 divides the secondary hollow interior region 15 into a centrally located central first chamber 87 within which the second camera 7 is located and an outer chamber 88 of annular shape extending around the central first chamber 87. An outwardly extending intermediate flange 91 extends outwardly around the cylindrical tube 80 of the coupling element 17 and supports an annular mounting disc 93 which extends across the outer chamber 88 to and between the upper flange 74 of the lower secondary shell 68 and the lower peripheral edge 75 of the upper secondary shell 73. The mounting disc 93 divides the outer chamber 88 into a lower outer chamber 92 and an upper outer chamber 83.

Four partition elements, namely, four partition walls 89 of opaque plastics material extend radially from the cylindrical tube 80 of the coupling element 17 between the mounting disc 93 and the base wall 69 of the lower secondary shell 68 across the lower outer chamber 92, and are equi-spaced cirumferentially around the coupling element 17, and divide the lower outer chamber 92 into four outer second chambers 90 within which the first cameras 6 and the infrared heat detectors 8 are located as will be described below.

A plurality of mounting openings 94 are formed in the mounting disc 93 for carrying respective mounting brackets 95 depending downwardly from the mounting disc 93 for carrying corresponding ones of the first cameras 6. Two mounting brackets 95 are located in each outer second chamber 90 for carrying two corresponding first cameras 6. Each mounting bracket 95 is of U-shaped construction and comprises a cross member 96 for securing to the mounting disc 93 and a pair of spaced apart downwardly extending side members 97 extending downwardly from the cross member 96 at respective opposite ends thereof. A carrier bracket 98 having a mounting plate 100 and a pair of spaced apart side mounting members 99 extending upwardly from the mounting plate 100 is pivotally carried on the side members 97 by screws 101 which define a common horizontal pivot axis 102 about which the carrier bracket 98 is pivotal. The mounting plate 100 of each mounting bracket 95 carries the corresponding one of the first cameras 6 so that the first camera 6 is pivotal about the horizontal pivot axis 102 in a substantially vertical plane for setting the angular direction of the corresponding first camera about the pivot axis 102. Nuts 103 on the screws 101 secure the carrier bracket 98 with the corresponding first camera at the desired angle. The mounting brackets 95 are secured to the mounting disc 93 by screws 109 through the mounting openings 94 into nuts 112 on mounting plates 113 with the mounting brackets 95 oriented, so that the first cameras 6 are arranged when viewed in plan view to be directed at 45° relative to each other. In other words, the first cameras 6 are directed in directions extending around a central vertical axis 104 defined by the coupling element 17 at the following angles 0°, 45°, 90°, 135°, 180°, 225°, 270° and 315° around the central vertical axis 104. One of the first cameras 6 in each outer second chamber 90 is mounted on the corresponding mounting bracket 95 with the mounting plate 100 oriented for directing the first camera 6 substantially horizontally, while the other first camera 6 in each outer second chamber 90 is mounted on the corresponding mounting bracket 95 with the mounting plate 100 thereof oriented to direct the first camera 6 in a generally outwardly downwardly direction at an angle of approximately 45° to the horizontal.

A cable 105 extends from each first camera 6 and terminates in a pin connector socket 106 mounted in the mounting disc 93 adjacent to the corresponding mounting bracket 95. A cable 107 terminating in a pin connector plug 108 is engageable with the corresponding socket 106 for coupling the corresponding camera 6 to the low voltage panel 60.

A cable accommodating duct 110 extending between the upper secondary shell 93 and the base wall 37 of the lower primary shell 34 accommodates the cables 107 from the respective socket 106 into the primary hollow interior region 11. The cable accommodating duct 110 is sealably secured to the upper secondary shell 73 and extends through a corresponding opening 111 in the main support platform 21, and in turn is sealably located in the base wall 37 of the lower primary shell 34 in order to communicate the secondary hollow interior region 15 with the primary hollow interior region 11 and to accommodate the cables 107 from the first cameras 6 in the secondary hollow interior region 15 to the low voltage panel 60 in the primary hollow interior region 11.

The infrared heat detectors 8 are located one in each outer second chamber 90 on mounting brackets 138 which extend downwardly from and are secured to the mounting disc 93.

Cables (not shown) from the infrared heat detectors 8 through corresponding ones of the openings 94 in the mounting disc 93 are accommodated through the cable accommodating duct 110 into the primary hollow interior region 11 to the low voltage panel 60.

The second camera 7 which is the PTZ camera 7 is located in the central first chamber 87 in the secondary hollow interior region 15. An opening 114 in the base wall 69 of the lower secondary shell 68 accommodates a portion of a housing 115 of the PTZ camera 7 through the base wall 69 of the lower secondary shell 68. A flange 116 extends outwardly from and around the housing 115 of the PTZ camera 7 for securing the PTZ camera 7 in the central first chamber 87 with the portion of the housing 115 of the camera 7 extending outwardly through the opening 114. A transparent dome 118 of the PTZ camera 7 is secured to the housing 114 by a flange 119 which in turn is secured to the base wall 69 and to the flange 116 of the housing 115 of the PTZ camera 7. A lense (not shown) of the PTZ camera 7 is located within the transparent dome 118 and is moveable angularly to scan approximately 360° around the transparent dome 118.

In this embodiment of the invention the under surface of the mounting disc 93 is painted or otherwise coloured a matt black colour, as are the four radially extending partition walls 89 coloured a matt black colour. The outer surface of a portion of the cylindrical tube 80 of the coupling element 17 which extends between the mounting disc 93 and the base wall 69 of the lower secondary shell 68 is also painted or coloured a matt black colour. By colouring the under surface of the mounting disc 93, the radially extending partition walls 89 and the outer surface of the cylindrical tube 80 a matt black colour, it is virtually impossible to see or identify the first cameras 6 and the infrared heat detectors 8 in the outer second chambers 90, since the first cameras 6 are also black, as are the infrared heat detectors 8.

An air accommodating duct 120 comprises a horizontal leg 121 and a vertical 122 joined by a bend 123. The horizontal leg 121 of the air accommodating tube 120 extends from the bend 123 through the primary hollow interior region 11 and terminates in an inlet 124 adjacent the opening 54 in the transverse wall 55 which separates the primary hollow interior region 11 from the main chamber 30 within which the air conditioning unit 31 is located for receiving conditioned air from the air conditioning unit 31. The vertical leg 122 of the air accommodating duct 120 extends downwardly from the bend 123 and through the communicating passageway 18 defined by the coupling element 17 and terminates in an air outlet 125 for accommodating air into the central first chamber 87. An air diffusing element 128 defining four circumferentially equi-spaced apart air accommodating channels 129 is located in the communicating passageway 18 and directs conditioned air from the air outlet 125 of the air accommodating duct 120 into the central first chamber 87 for maintaining the temperature of the second camera 7 at a desired working temperature. The air accommodating channels 129 of the air diffusing element 128 also direct conditioned air from the air outlet 129 of the air accommodating duct 120 into the four outer second chambers 90, as will be described below, for maintaining the temperature of the first cameras 6 and the infrared heat detectors 8 also at a desired working temperature.

A circulating means, namely, an electrically powered air circulating fan 130 is located in a housing 131 located in the vertical leg 122 of the air accommodating duct 120 intermediate the ends thereof for circulating air through the air accommodating duct 120 from the air inlet 124 to the air outlet 125.

Four communicating openings 133 located in the cylindrical tube 80 of the coupling element 17 between the radial partition walls 89 and the base wall 69 of the lower secondary shell 68 and the mounting disc 93 accommodate air from the air accommodating channels 129 of the air diffusing element 128 and from the central first chamber 87 into corresponding ones of the outer second chambers 90. Communicating openings 135 in the mounting disc 93 accommodate air from the outer second chambers 90 into the upper outer chamber 83. Communicating opening 137 in the a cylindrical tube 80 of the coupling element 17 accommodate air from the upper outer chamber 83 into the communicating passageway 18 defined by the coupling element 17 externally of the air accommodating duct 120, which in turn returns the air from the upper outer chamber 83 to the primary hollow interior region 11.

Accordingly, the fan 130 in the air accommodating duct 120 circulate conditioned air from the air conditioning unit 31 from the primary hollow interior region 11 adjacent the air conditioning unit 31 to the central first chamber 87 of the secondary hollow interior region 15, and in turn to the outer second chambers 90, which is then returned through the upper outer chamber 83 through the communicating passageway 18 to the primary hollow interior region 11 where it is in turn returned to the air conditioning unit 31 for further conditioning and circulation by the fan 130.

Accordingly, the conditioned air from the air conditioning unit 31 depending on whether the air conditioning unit 31 is operating for cooling or heating, cools or heats as the case may be the PTZ camera 7 and then cools or heats, as the case may be the first cameras 6 in the outer second chambers 19 as well as the infrared heat detectors 8, and is then returned to the primary hollow interior region 11 for cooling or heating, as the case may be components on the medium voltage panel 59 and the low panel voltage 60 before it is again returned to the air conditioning unit 31 for heating or cooling as the case may be.

A mounting bracket 140 extending from the main support platform 21 supports a mast 142 extending upwardly from the mounting bracket 140. A radio antenna 143 is mounted on the mast 142 for transmitting and receiving signals between the surveillance unit 1 and the remote central monitoring station (not shown). A housing 145 mounted on the mast 142 comprises a lightning barrier located therein through which the antenna 143 is connected by cables 146 to the low voltage panel 60.

A lightning conductor 144 extending upwardly from the mast 142 conducts lightning which is earthed through the mast 142, the mounting bracket 140, the mains support plate 21 and the support pole 3 to ground.

The low voltage panel comprises two backup power supplies 150 which are maintained powered and charged by a 220 volt power supply from the medium voltage panel 59. Two control units 152 mounted on the low voltage panel 60 control the operation of the first cameras 6 and the second camera 7. A radio transmitter and receiver 153 on the low voltage panel 60 transmits and receives radio signals to and from the remote central monitoring station via the antenna 143. Control signals transmitted by the remote monitoring station for controlling the operation of the first and second cameras 6 and 7 are received by the radio transmitter receiver 153 and relayed to the control units 152 which read the control signals and control the operation of the first and second cameras 6 and 7 in response to the received control signals from the remote central monitoring station (not shown). The control units 152 also comprise data processing circuitry which reads image data from the cameras and relays the image data to the radio transmitter receiver 153 for transmission via the antenna 143 to the remote monitoring station. Signals from the infrared heat detectors 8 are also read by the data processing circuitry in the control units 152 and relayed via the radio transmitter receiver 153 to the remote central monitoring station.

In use, with the apparatus 5 mounted on the support pole 3 by the main support platform 21 and the antenna secured to the mast 142 the surveillance unit 1 is ready for use. The first and second cameras 6 and 7, in general, are continuously powered. Depending on whether the surveillance unit 1 is located in a hot environment or a cold environment the air conditioning unit 31 appropriately operates to produce heated or cooled conditioned air which is delivered into the primary hollow interior region 11 by the internal high pressure cross fan thereof to maintain the air in the hollow interior region at a temperature in the range of 18° C. to 25° C., and in turn to maintain the components on the medium and low voltage panels 59 and 60 at a safe working temperature. The circulating fan 130 circulates the conditioned air from the primary hollow interior region 11 through the air accommodating duct 120 into the secondary hollow interior region 15 where the conditioned air maintains the air temperature in the secondary hollow interior region 15 within the range of 18° C. to 25° C. for in turn maintaining the first and second cameras 6 and 7 and the infrared heat detectors 8 within the safe working temperature range. Air is returned through the communicating passageway 18 from the secondary hollow interior region 15 to the primary hollow interior region 11 from which the air is drawn into the air conditioning unit 31 for further cooling or heating, as the case may be by the high pressure cross fan located internally in the air conditioning unit 31.

During normal operation of the surveillance unit an operator at the remote central monitoring station transmits instructions for adjusting and operating the cameras via a radio transmitter (not shown) at the remote central monitoring station, which are received via the antenna 143 by the radio transmitter receiver 153. Signals received by the radio transmitter receiver 153 from the central monitoring station are read by the control units 152 which then process the signals and operate the cameras appropriately. For example, the signals to control the PTZ camera 7 typically would be to swivel the camera through 360° in order to scan an area of 360° around the location of the surveillance unit 1. The focus of the PTZ camera 7 is also adjustable by appropriate signals from the central monitoring station. The focus of the first cameras 6 is also controllable and adjustable by signals transmitted by the central monitoring station. Thus, an operator at the central monitoring station detecting an unusual occurrence, by transmitting appropriate control signals via the transmitter (not shown) at the central monitoring station, can control the focus of an appropriate one or ones of the first camera 6 to facilitate an investigation of the area at which the unusual occurrence has been detected. Additionally, the zoom of the PTZ camera 7 may be adjusted to zoom in on the area in which the unusual occurrence has been detected in order to further investigate the unusual occurrence by transmitting appropriate control signals from the central monitoring station.

Signals from the infrared heat detectors 8 are transmitted by the radio transmitter receiver 153 and monitored at the central monitoring station.

In practice it is envisaged that where it is desired to monitor the grounds around the building, an appropriate number of surveillance units 1 will be located in the grounds in order to facilitate monitoring and scanning of the entire area which is to be placed under surveillance. Alternatively, where a perimeter of an estate or the border of a country or a state is to be monitored a plurality of the surveillance units 1 will be located at spaced apart intervals along the perimeter of the estate or the border of the country or state, the spacing between the surveillance units 1 will be such that there will be a slight overlap between the areas covered by adjacent ones of the surveillance units 1. Similarly, where it is desired to monitor a pipeline, for example, a pipeline laid over the surface of a desert stretching for many hundreds of kilometers, it is envisaged that a plurality of the surveillance units 1 will be located at spaced apart intervals along the location of the pipeline, with the spacing between adjacent ones of the surveillance units 1 being such that there would be slight overlap of the areas scanned by adjacent ones of the surveillance units.

While the surveillance unit 1 according to the invention and the apparatus 5 which is also according to the invention have been described for housing particular types of surveillance devices, namely the IP cameras 6 and PTZ cameras 7 as well as infrared heat detectors 8, it is envisaged that the surveillance unit and the apparatus may be adapted for housing other types of cameras, detectors and indeed, any other types of surveillance devices. It will also be appreciated that while communications between the surveillance unit 1 according to the invention and the remote central monitoring station have been described as being via a radio communications system, any other suitable communication system may be used, in certain cases, it is envisaged that the surveillance units 1 may be hard wired back to the remote central monitoring station.

It will be appreciated that while the secondary housing has been described as being located beneath the primary housing, in certain cases, the secondary housing may be located above the primary housing. It will also be appreciated that while the apparatus has been described as being mounted on top of a support pole, the apparatus 5 according to the invention may be mounted on any suitable support, and where mounted on a support pole, may be mounted by a bracket onto the side of the support pole. It is also envisaged that the apparatus 5 according to the invention may be mounted by a suitable bracket to a wall or any other suitable support.

It is also envisaged that the surveillance units may be used as mobile telephone signal boosters, and this would be particularly so in cases where a plurality of surveillance units are located at spaced apart intervals along a pipeline, or along a border of a country or state.

The invention claimed is:

1. Apparatus for housing surveillance devices, the apparatus comprising:
    a primary housing defining a primary hollow interior region for housing control circuitry, and being adapted to communicate with an air conditioning element for receiving conditioned air therefrom to produce a controlled environment in the primary hollow interior region,
    a secondary housing defining a secondary hollow interior region for housing the surveillance devices, the secondary housing being coupled to the primary housing,
    a communicating passageway communicating the secondary hollow interior region with the primary hollow interior region,
    an air accommodating duct extending between the primary hollow interior region and the secondary hollow interior region through the communicating passageway,
    a circulating means for circulating air between the primary hollow interior region and the secondary hollow interior region to produce a controlled environment in the secondary hollow interior region, the circulating means being located for circulating the air from the primary hollow interior region to the secondary hollow interior region through one of the air accommodating duct and the communicating passageway externally of the air accommodating duct and returning the air from the secondary hollow interior region to the primary hollow interior region through the other one of the air accommodating duct and the communicating passageway externally of the air accommodating duct, and a main support platform for supporting the primary housing with the primary housing mounted on and located above the main support platform, and with the secondary housing located beneath the primary housing and beneath the main support platform, the main support platform being adapted for mounting to a support element.

2. Apparatus as claimed in claim 1 in which a central partition element is located in the secondary hollow interior region of the secondary housing forming a central first chamber and an outer chamber extending around the central first chamber, the outer chamber communicating with the central first chamber for accommodating air therebetween.

3. Apparatus as claimed in claim 2 in which at least two radial partition elements located in the secondary hollow interior region of the secondary housing extending from the central partition element divide the outer chamber into at least two outer second chambers.

4. Apparatus as claimed in claim 3 in which the central first chamber communicates with one of the air accommodating ducts and the communicating passageway externally of the air accommodating duct, and each outer second chamber communicates with the other one of the air accommodating duct and the communicating passageway externally of the air accommodating duct.

5. Apparatus as claimed in claim 4 in which an annular mounting disc is located in the secondary hollow interior region of the secondary housing extending around and outwardly from the central partition element into the outer chamber, and dividing the outer chamber into a lower outer chamber and an upper outer chamber, the outer second chambers being formed in the lower outer chamber by the radial partition elements, and mounting means for mounting respective ones of a plurality of first cameras in corresponding ones of the outer second chambers being mounted on the mounting disc.

6. Apparatus as claimed in claim 5 in which each outer second chamber is adapted for housing a surveillance device comprising an infrared heat detector, and the infrared heat detectors are provided in respective ones of the outer second chambers.

7. Apparatus as claimed in claim 2 in which a second camera comprising a pan tilt and zoom camera is located in the central first chamber.

8. Apparatus as claimed in claim 1 in which the secondary housing comprises an upper secondary housing element coupled to the primary housing, and a lower secondary housing element of transparent material sealably secured to the upper secondary housing element.

9. Apparatus as claimed in claim 1 in which the primary housing comprises an upper primary housing element and a lower primary housing element sealably secured to the upper primary housing element.

10. Apparatus as claimed in claim 1 in which the main support platform is adapted to accommodate the communicating passageway extending between the primary housing and the secondary housing through the main support platform.

11. Apparatus as claimed in claim 1 in which a coupling means is provided for coupling the secondary housing with the primary housing, the coupling means defining the communicating passageway.

12. Apparatus as claimed in claim 11 in which the main support platform is adapted for accommodating the coupling means therethrough.

13. Apparatus as claimed in claim 1 in which the primary housing defines a main chamber for accommodating the air conditioning unit, the main chamber being adapted for receiving the air conditioning unit with the primary hollow interior region communicating with the air conditioning unit for receiving the conditioned air therefrom and for returning air to be conditioned thereto, with the primary and secondary hollow interior regions, the communicating passageway and the air conditioning unit forming a closed system.

14. Apparatus as claimed in claim 1 in which the circulating means comprises an electrically powered fan.

15. Apparatus as claimed in claim 1 in which a mounting bracket secured to the main support platform carries a mast to which an antenna is mounted.

16. Apparatus as claimed in claim 1 in which an electrical circuit support platform is located in the primary hollow interior region of the primary housing for supporting data processing circuitry for processing data from the surveillance devices for relaying to a remote central monitoring station.

17. Apparatus as claimed in claim 16 in which the electrical circuit support platform is adapted for accommodating a radio transmitter for transmitting data from the data processing circuitry to the central monitoring station.

18. Apparatus as claimed in claim 16 in which the electrical circuit support platform is adapted for mounting a radio transmitter/receiver thereon for receiving control signals from the central monitoring station for controlling the operation of at least one of the surveillance devices.

19. A surveillance unit comprising an elongated upstanding support pole, and apparatus as claimed in claim 1 mounted thereon.

20. Apparatus as claimed in claim 1 in which a cable accommodating duct extends between the secondary housing and the primary housing communicating the secondary hollow interior region with the primary hollow interior region for accommodating electrical cables between the secondary hollow interior region and the primary hollow interior region.

21. Apparatus as claimed in claim 20 in which the main support platform is adapted for accommodating the cable accommodating duct therethrough.

22. Apparatus as claimed in claim 1 in which the circulating means is located in the air accommodating duct.

* * * * *